US010484880B2

(12) United States Patent
Syrjärinne et al.

(10) Patent No.: US 10,484,880 B2
(45) Date of Patent: Nov. 19, 2019

(54) DETERMINING ONE OR MORE POTENTIAL INSTALLATION POSITIONS AND/OR AREAS FOR INSTALLING ONE OR MORE RADIO POSITIONING SUPPORT DEVICES

(71) Applicant: HERE GLOBAL B.V., Eindhoven (NL)

(72) Inventors: Jari Tapani Syrjärinne, Tampere (FI); Muhammad Irshan Khan, Tampere (FI); Pavel Ivanov, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/592,832

(22) Filed: May 11, 2017

(65) Prior Publication Data
US 2017/0332248 A1    Nov. 16, 2017

(30) Foreign Application Priority Data
May 13, 2016    (GB) .................................. 1608460.0

(51) Int. Cl.
*H04W 40/00*    (2009.01)
*H04W 16/20*    (2009.01)
(Continued)

(52) U.S. Cl.
CPC .......... *H04W 16/20* (2013.01); *G01C 21/206* (2013.01); *G01S 5/0242* (2013.01); *G01S 5/0252* (2013.01);
(Continued)

(58) Field of Classification Search
CPC . H04W 16/20; H04W 16/225; H04W 64/003; H04W 84/12; H04W 88/08;
(Continued)

(56) References Cited

U.S. PATENT DOCUMENTS 6,292,929 B2 *   9/2001   Scepanovic ......... G06F 17/5072
                                                        716/118
6,336,035 B1 *   1/2002   Somoza ............... H04W 16/18
                                                        455/423
(Continued)

FOREIGN PATENT DOCUMENTS

EP    2 456 251 A1    5/2012
EP    2456251 A1 *    5/2012    ............ H04W 16/18
(Continued)

OTHER PUBLICATIONS

Extended European Search Report for European Patent Application No. 17169543.0 dated Nov. 7, 2017, 6 pages.
(Continued)

*Primary Examiner* — Mahendra R Patel
(74) *Attorney, Agent, or Firm* — Alston & Bird LLP

(57) ABSTRACT

A method performed by an apparatus is presented which comprises determining one or more potential installation positions and/or areas for installing one or more radio positioning support devices in a predetermined environment, wherein said one or more potential installation positions and/or areas are determined at least partially based on at least one radio coverage model.

19 Claims, 7 Drawing Sheets

(51) Int. Cl.
*G01S 5/02* (2010.01)
*G01C 21/20* (2006.01)
*H04W 16/22* (2009.01)
*H04W 64/00* (2009.01)
*H04W 4/80* (2018.01)
*H04W 84/12* (2009.01)
*H04W 88/08* (2009.01)

(52) U.S. Cl.
CPC ....... *H04W 16/225* (2013.01); *H04W 64/003* (2013.01); *H04W 4/80* (2018.02); *H04W 84/12* (2013.01); *H04W 88/08* (2013.01)

(58) Field of Classification Search
CPC .... H04W 88/02; H04W 16/18; G01C 21/206; G08B 1/00; H04L 12/66; H04L 12/24; H04L 41/0826; H04L 41/083; H04L 41/0823; G01S 5/0273; G01S 5/0252; G01S 5/14; G01S 11/06
USPC .................. 701/470, 469; 342/357.31, 352
See application file for complete search history.

(56) References Cited

U.S. PATENT DOCUMENTS

| | | | | |
|---|---|---|---|---|
| 6,711,148 | B1* | 3/2004 | Hills | H04L 41/0823 370/338 |
| 9,131,403 | B1 | 9/2015 | Courchesne et al. | |
| 2004/0236547 | A1* | 11/2004 | Rappaport | G06F 17/509 703/2 |
| 2005/0068902 | A1* | 3/2005 | Rath | H04W 84/02 370/256 |
| 2005/0136845 | A1* | 6/2005 | Masuoka | G01S 5/0294 455/67.14 |
| 2005/0285793 | A1* | 12/2005 | Sugar | G01S 5/0252 342/465 |
| 2006/0019679 | A1* | 1/2006 | Rappaport | G01S 5/0252 455/456.5 |
| 2008/0004796 | A1* | 1/2008 | Schott | G01C 21/005 701/434 |
| 2008/0180227 | A1* | 7/2008 | Le | H04L 12/66 340/286.02 |
| 2008/0182583 | A1 | 7/2008 | Le et al. | |
| 2009/0140926 | A1* | 6/2009 | Traster | G01S 1/70 342/463 |
| 2010/0285815 | A1* | 11/2010 | Treu | G01S 5/0263 455/456.1 |
| 2011/0037571 | A1* | 2/2011 | Johnson, Jr. | G06K 7/0095 340/10.5 |
| 2011/0159926 | A1* | 6/2011 | Whittaker | H04W 36/0083 455/561 |
| 2012/0129559 | A1* | 5/2012 | Pochop, Jr. | H04W 16/18 455/507 |
| 2012/0182144 | A1* | 7/2012 | Richardson | G01S 5/021 340/539.13 |
| 2012/0202538 | A1* | 8/2012 | Uusitalo | H04B 17/24 455/500 |
| 2013/0281100 | A1* | 10/2013 | Lanzo | H04W 16/18 455/446 |
| 2013/0310093 | A1* | 11/2013 | Giannakis | H04W 24/02 455/501 |
| 2014/0167918 | A1* | 6/2014 | Stern | G06K 7/0095 340/10.1 |
| 2014/0241244 | A1* | 8/2014 | Traore | H04W 64/00 370/328 |
| 2014/0244817 | A1* | 8/2014 | Pulleti | H04W 16/18 709/223 |
| 2014/0295813 | A1* | 10/2014 | Grech | H04W 16/18 455/418 |
| 2014/0340084 | A1* | 11/2014 | Alon | A61B 5/01 324/309 |
| 2015/0017994 | A1* | 1/2015 | Salami | H04W 48/12 455/446 |
| 2015/0018028 | A1* | 1/2015 | Uplenchwar | H04W 52/143 455/522 |
| 2015/0133173 | A1* | 5/2015 | Edge | G01S 1/66 455/456.6 |
| 2015/0282111 | A1* | 10/2015 | Yang | H04W 64/00 455/456.1 |
| 2016/0161592 | A1* | 6/2016 | Wirola | G01S 5/0252 702/150 |
| 2018/0012137 | A1* | 1/2018 | Wright | G05B 13/0265 |

FOREIGN PATENT DOCUMENTS

| | | | | |
|---|---|---|---|---|
| EP | 2741535 | A1 * | 6/2014 | |
| EP | 2741535 | A1 | 6/2014 | |
| EP | 3109808 | A1 * | 12/2016 | |
| WO | WO-2004017569 | A2 * | 2/2004 | |
| WO | WO-2008062366 | A2 * | 5/2008 | |
| WO | WO 2012/036640 | A1 | 3/2012 | |
| WO | WO 2013/165337 | A1 | 11/2013 | |
| WO | WO-2015024758 | A1 * | 2/2015 | |
| WO | WO 2016055014 | A1 * | 4/2016 | ........... H04W 64/00 |
| WO | WO-2016055014 | A1 * | 4/2016 | |
| WO | WO-2017000979 | A1 * | 1/2017 | |

OTHER PUBLICATIONS

Combined Search and Examination Report from Great Britian Application No. GB1608460.0 dated Aug. 26, 2016, 7 pages.
Chawathe, S. S., *Beacon Placement for Indoor Localization Using Bluetooth*,[online] [retrieved Feb. 5, 2019], Retrieved for the Internet: <URL: http://aturing.umcs.maine.edu/~sudarshan.chawathe/pubs/bpil.pdf>, (Oct. 2008) 6 pages.
Laguna, M. et al., *Diversified Local Search For the Optimal Layout of Beacons in an Indoor Positioning System*[online] [retrieved Feb. 5, 2019]. Retrieved from the Internet: <URL: http://digital.csic.es/bitstream/10261/33449/1/IEETransLagunaRoa2009.pdf>, (dated Jul. 24, 2007) 24 pages.

* cited by examiner

DETERMINING ONE OR MORE POTENTIAL INSTALLATION POSITIONS AND/OR AREAS FOR INSTALLING ONE OR MORE RADIO POSITIONING SUPPORT DEVICES

CROSS-REFERENCE TO RELATED APPLICATIONS

This application claims priority to GB Application No. 1608460.0, filed May 13, 2016, the entire contents of which are incorporated herein by reference.

FIELD

The invention relates to the field of positioning and more specifically to determining one or more potential installation positions and/or areas for installing one or more radio positioning support devices in a predetermined environment.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A Bluetooth based positioning solution such as a self-contained positioning system, for instance, may be divided in at least three stages, an installation stage, a training stage and a positioning stage.

In the installation stage, Bluetooth beacons are installed in the environment for which a positioning solution is to be provided.

In the subsequent training stage, learning data are collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of Bluetooth beacons transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of Bluetooth beacons and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

According to the invention, a method performed by an apparatus is presented, which comprises determining one or more potential installation positions and/or areas for installing one or more radio positioning support devices in a predetermined environment, wherein the one or more potential installation positions and/or areas are determined at least partially based on at least one radio coverage model.

The predetermined environment may be an environment for which a positioning solution is to be provided. For example, the predetermined environment is or comprises an indoor environment such as a building and/or a complex of buildings (e.g. a shopping center, a parking garage, an airport, a company site, etc.).

For example, a potential installation position is a position in the predetermined environment and/or relative to the predetermined environment, and a potential installation area is an area in the predetermined environment and/or relative to the predetermined environment. A potential installation position may be understood to be a proposal for a position in the predetermined environment at which a radio positioning support devices may be installed. Similarly a potential installation area may be understood to be a proposal for an area in the predetermined environment within which a radio positioning support devices may be installed.

A radio coverage model may represent an estimate of a two-dimensional or a three-dimensional coverage map. It may describe (e.g. define) the expected radio coverage (e.g. an expected coverage area) of a radio positioning support device within which radio signals send or triggered to be sent by the radio positioning support device installed at a (potential) installation position are expected to be observable. The real radio coverage of the radio positioning support device may however deviate from such an expected radio coverage. A radio signal may be understood to be observable at a specific position and/or in a specific area if the radio signal is receivable with a minimum quality (e.g. a minimum signal-to-noise ratio and/or a minimum signal power) at this specific position and/or within this specific area.

A radio coverage model may be a hard-boundary model or a soft-boundary model (e.g. a hard-boundary model or a soft-boundary model describing an expected radio coverage).

An example for a soft-boundary radio coverage model may be a parametric radio model. Data of such a parametric radio model may be considered to be data which enable determination of one or more characteristics of one or more radio signals send or triggered to be sent by a radio positioning support device that are expected to be observable at different positions. For example, data of such a parametric radio model may comprise radio parameter values of the parametric radio model. Using radio parameter values of the parametric radio model may have the effect that the required amount of data for defining the one or more characteristics of one or more radio signals may be particularly small. An example of a parametric radio model is a path loss model for radio signals send or triggered to be sent by a radio positioning support device. In this case, the radio parameters values may comprise a path loss exponent and an indication of a transmission power used by the transmitter. Based on data of a parametric radio model an expected radio coverage of a radio positioning support device installed at a (potential) installation position may be determined.

An example for a hard-boundary radio coverage model may be a geometric model. Data of such a geometric radio model may be considered to be data which (e.g. geometrically) describe (e.g. define) an expected radio coverage of a radio positioning support device installed at a (potential) installation position.

For example, the at least one radio coverage model is a radio coverage model for a radio positioning support device which describes (e.g. defines) and/or enables determination of an expected radio coverage of the radio positioning support device installed at a (potential) installation position within which radio signals send or triggered to be sent by the radio positioning support device are expected to be observable. Based on such a radio coverage model, the expected radio coverage in the vicinity of the (potential) installation position of the radio positioning support device may be determined.

The one or more potential installation positions and/or areas are for example determined at least partially based on the at least one radio coverage model such that it is expected that positioning (i.e. position determining) based on the one or more radio positioning support devices at least in a specific area of the predetermined environment is possible if the one or more radio positioning support devices are installed at the one or more potential installation positions and/or within the one or more potential installation areas. Positioning based on the one or more radio positioning support devices at least in a specific area of the predetermined environment may be understood to be possible if radio signals of a predetermined minimum number of radio positioning support devices are expected to be observable (e.g. receivable with a minimum quality such as a minimum signal-to-noise ratio and/or a minimum signal power) in this specific area of the predetermined environment.

In certain positioning solutions, a position may be determined by determining the distance to the radio positioning support devices based on the radio signals of the radio positioning support devices which are observable at the position. Such positioning solutions for example require that radio signals of a minimum number of three or four radio positioning support devices are observable at a position to make positioning (i.e. position determining) based on the observable radio signals possible.

In certain exemplary embodiments of the invention, the method according to the invention may be used during the installation stage of a positioning system. In a first step of the installation stage, one or more potential installation positions for installing one or more radio positioning support devices in the predetermined environment are for example determined. Subsequently, one or more radio positioning support devices may be installed at the one or more potential installation positions or in the vicinity of the potential installation positions. If an installation position is for example not accessible, the installation position may be skipped (e.g. ignored) and/or a radio positioning support device may be installed at a position close to the potential installation position. In a second step of the installation stage, one or more potential installation areas for installing one or more radio positioning support devices in the predetermined environment may be determined, for example at least partially based on the radio positioning support devices which have been installed in the first step. The one or more potential installation areas determined during the second step may be specific areas of the predetermined environment in which less than a predetermined minimum number of radio positioning support devices are expected to be observable (e.g. receivable with a minimum quality such as a minimum signal-to-noise ratio and/or a minimum signal power). In these one or more potential installation areas may then installed further radio positioning support devices. The second step may be repeated until no potential installation areas are determined in the second step.

In the following, the features of exemplary embodiments according to the invention are described by way of examples.

According to an exemplary embodiment of the invention, the method further comprises receiving and/or holding available a model of the predetermined environment, wherein the one or more potential installation positions and/or areas are determined at least partially based on the model of the predetermined environment.

The model of the predetermined environment may be a two-dimensional and/or a three-dimensional graphical model of the predetermined environment. The model may be true to scale. Data of such a model may accordingly represent a two-dimensional and/or a three-dimensional graphical model. Examples of a two-dimensional graphical model are a map, a floor plan, etc. Based on such a model of the predetermined environment positions and/or areas located within the predetermined environment may be determinable.

As described above, the one or more potential installation positions and/or areas may be positions and/or areas in the predetermined environment. Accordingly, the one or more potential installation positions and/or areas are for example determined at least partially based on the model of the predetermined environment to be located within the predetermined environment.

The model of the predetermined environment may be received by user input on the apparatus (e.g. by a user interface of the apparatus). Alternatively or additionally, data representing the model of the predetermined environment may be received by the apparatus (e.g. by a communication interface of the apparatus and/or by a storage medium reader of the apparatus). For example, data representing the model of the predetermined environment may be received by a communication interface of the apparatus from a server. Such a server may hold available data representing the model of the predetermined environment for retrieval by the apparatus, for example the apparatus may download the data representing this model from the server via a network connection (e.g. an internet connection).

In certain exemplary embodiments of the invention, data representing the model of the predetermined environment may be received from the at least one installed radio positioning support device. For example, data representing the model of the predetermined environment may be received by the apparatus (e.g. by a radio interface such as a Bluetooth and/or BLE receiver and/or a Bluetooth and/or BLE transceiver of the apparatus) in a signal (e.g. a radio signal) sent or triggered to be sent by the at least one installed positioning support device.

Holding available the model of the predetermined environment may be understood to mean that data representing the model of the predetermined environment are stored in a memory means of the apparatus. Example of memory means include a volatile memory such as a Dynamic Random Access Memory (DRAM) and a non-volatile memory such as a Read Only Memory (ROM), a programmable ROM (PROM), an erasable-programmable ROM (EPROM), electrically erasable programmable ROM (EEPROM), a FLASH Memory, a Magnetoresistive Random Access Memory (MRAM), a Ferroelectric Random Access Memory (Fe-RAM) and a hard disc.

According to an exemplary embodiment of the invention, the method further comprises sensing at least one installation position of at least one installed radio positioning support device and/or receiving installation position information representing the at least one installation position, wherein the at least one radio coverage model is a radio coverage model for the at least one installed radio position support device, and wherein the one or more potential installation positions and/or areas are determined at least partially based on the at least one installation position and the radio coverage model for the at least one installed radio positioning support device.

For example, the at least one installed radio positioning support device is installed at the at least one installation position in the predetermined environment.

The installation position of at least one installed radio positioning support device may be sensed (e.g. measured) by sensing means such as a positioning sensor, for example a distance measurement sensor (e.g. an optical distance measurement sensor such as a laser distance measurement sensor). Distances between the installation position of the at least one installed radio positioning support device and (fixed) objects and/or features of the predetermined environment may be used to describe (e.g. define) the installation position relative to the predetermined environment, for example the installation position of at least one installed radio positioning support device may be described and/or defined by horizontal distance(s) and/or vertical distance(s) in at least two or three orthogonal directions to one or more fixed objects and/or features (e.g. a wall, a floor, a ceiling, a corner, a door opening, a window opening, etc.) of the predetermined environment.

The positioning sensor may be configured to perform the sensing (e.g. the measurement) full-automatically. In this case, it may only be necessary to place the positioning sensor at the desired position (e.g. the installation position of at least one installed radio positioning support device) and to initiate the sensing (e.g. the measurement). For example, a distance measurement sensor may be configured to measure distances to (fixed) objects and/or features (e.g. objects and/or features of the predetermined environment) next to the distance measurement sensor in at least two or three orthogonal directions (e.g. horizontal and/or vertical directions). Alternatively, the measurement may for example be performed semi-automatically. In this case, it may for example be necessary to align and/or turn the sensor during the sensing (e.g. the measurement). For example, a distance measurement sensor may be configured to measure a distance to a (fixed) object and/or feature (e.g. an object and/or feature of the predetermined environment) next to the distance measurement sensor in only one specific direction such that it is necessary to align and/or turn the sensor for measuring distances in at least two or three orthogonal directions (e.g. horizontal and/or vertical directions).

If the at least one installed radio positioning support device is installed in a room of the predetermined environment, the installation position may be sensed based on a model of the predetermined environment by determining the room and measuring (a) vertical distance(s) and/or (a) horizontal distance(s) from the at least one installed radio positioning support device to (fixed) objects and/or features (e.g. (a) wall(s), a ceiling and/or a floor) of the room. The measured distances may be selected such that they are sufficient for determining the installation position based on the model of the predetermined environment. If the model of the predetermined environment is a two-dimensional graphical model such as a floor plan, it may for example be sufficient to measure the horizontal distances in at least two orthogonal directions to one or more walls of the room.

In certain exemplary embodiments of the invention, a user (e.g. a user installing the at least one installed radio positioning support device at the installation position) may initiate sensing the installation position of the at least one installed radio positioning support device. For example, the user may indicate, on a user interface of the apparatus, a room in which the at least one installed radio positioning support device is installed. Furthermore, the user may place a distance measurement sensor of the apparatus at the installation position of the installed radio positioning support device and initiate measuring the vertical distances and the horizontal distances from the at least one installed radio positioning support device to (fixed) objects and/or features (e.g. (a) wall(s), a ceiling and/or a floor) of the room.

Alternatively or additionally, installation position information representing the at least one installation position of the at least one installed radio positioning support device may be received. For example, the installation position information may be received by user input on the apparatus (e.g. by a user interface of the apparatus). For example, a user may input the installation position information on a user interface of the apparatus. Alternatively or additionally, the installation position information may be determined based on user input. For example, a model of the predetermined environment may be displayed on a user interface, e.g. a touch sensitive display. In this example, a user may mark (e.g. by a touch input on the touch sensitive display) the at least one installation position on the displayed model of the predetermined environment and based on this marking the installation position information may then be determined.

For example, the installation position information describes the position of the at least one installation position of the at least one installed radio positioning support device relative to the predetermined environment, for example by horizontal distance(s) and/or vertical distance(s) to one or more fixed objects and/or features (e.g. a wall, a floor, a ceiling, a corner, a door opening, a window opening, etc.) of the predetermined environment. If the at least one installed radio positioning support device is installed in a room of the predetermined environment, the installation position information for example comprises vertical distance(s) and/or horizontal distance(s) from the at least one installed radio positioning support device to one or more wall(s), the ceiling and/or the floor of the room.

According to an exemplary embodiment of the invention, the radio positioning support devices and/or the installed radio positioning support device is one of:
 a Bluetooth beacon;
 a Bluetooth beacon enabling Bluetooth low energy mode; and a Bluetooth low energy beacon.

Such beacons can be easily installed at various positions and require little to no maintenance. For example, a plurality of beacons may be easily distributed over a certain area and may cover a certain area (e.g. the predetermined environment) with signals send by the beacons. Also, Bluetooth technologies are supported by many mobile user devices by default such as most smartphones, most tablet computers, most notebook computers, most smart watches and most smart bands, etc. Using Bluetooth beacons and/or BLE beacons may thus have the effect that the method may be based on existing capabilities in many mobile devices without any adaptation of hardware. As a result, the approach may be globally scalable and have low maintenance and deployment costs. In addition, regarding positioning utilizing received signal strength (RSS) the end-user experience may be acceptable with these technologies, since a horizontal positioning accuracy of 2-3 meters as well as a high reliability in floor detection may be achieved. The beacons may be stand-alone devices or be integrated into or attached to some other device. For instance, a radio positioning support device may be a Bluetooth tag or token or a part thereof comprising such a beacon. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of first and second apparatuses than variations of Bluetooth beacons may be used as well, for instance tags or other devices that are configured to transmit ultra-wideband (UWB) signals or ultra-sound signals or any wireless signals that might emerge in the future.

As mentioned above, many mobile devices already comprise Bluetooth receivers and/or BLE receivers. Thus, each of the above embodiments may have the effect that positioning solutions based on such beacons can be employed without any further hardware updates on the mobile device side. As an example, the mobile device may comprise a Bluetooth and/or BLE component, which includes at least a Bluetooth and/or BLE receiver. The Bluetooth and/or BLE receiver may also be a part of a Bluetooth and/or BLE transceiver. The Bluetooth and/or BLE component may be configured to detect radio signals that are broadcast by Bluetooth and/or BLE beacons.

However, the invention is to be understood to be not limited to such beacons. Alternatively or additionally, the radio positioning support devices and/or the installed radio positioning support device may for example be one of:
 a cellular base station; and
 an access point and/or a router of a wireless local area network.

According to an exemplary embodiment of the invention, the method further comprises receiving the radio coverage model and/or parameter information representing the at least at least one parameter of the radio coverage model.

The radio coverage model and/or the parameter information representing at least at least one parameter of said radio coverage model may be received by user input on the apparatus (e.g. by a user interface of the apparatus). Alternatively or additionally, data representing the radio coverage model and/or the parameter information representing at least one parameter of the radio coverage model may be received by the apparatus (e.g. by a communication interface of the apparatus and/or by a storage medium reader of the apparatus). For example, data representing the radio coverage model and/or the parameter information representing at least one parameter of the radio coverage model may be received by a communication interface of the apparatus from a server. Such a server may hold available data representing the radio coverage model and/or parameter information representing the at least one parameter of the radio coverage model for retrieval by the apparatus, for example the apparatus may download the data representing the radio coverage model and/or the parameter information representing at least one parameter of the radio coverage model via a network connection (e.g. an internet connection).

The at least one parameter of the radio coverage model may for example be a radio transmission parameter of a parametric radio model and/or a parameter of a geometric model.

In certain exemplary embodiments of the invention, determining the radio coverage model for the at least one installed radio positioning support device at least partially based on the received information representing the at least at least one parameter of the radio coverage mode. Determining the radio coverage model for the at least one installed radio positioning support device at least partially based on the received information may be understood to mean that a parameter of a predetermined radio coverage model is determined at least partially based thereon and/or that a radio coverage model is selected from a set of predetermined radio coverage models at least partially based on thereon.

In case the predetermined radio coverage model is a geometric model (e.g. a square) and the received information represents a parameter (e.g. an edge length value) of such a model, the corresponding parameter of the geometric model (e.g. an edge length value of the square) may for example be determined to be equal of the parameter (e.g. the edge length value) represented by the received information.

According to an exemplary embodiment of the invention, the method further comprises sensing at least one radio transmission parameter of the at least one installed radio positioning support device and/or receiving radio transmission parameter information representing the at least one radio transmission parameter of the at least one installed radio positioning support device; and determining the radio coverage model for the at least one installed radio positioning support device at least partially based on the radio transmission parameter.

The at least one radio transmission parameter may be sensed (e.g. measured) by sensing means such as a radio sensor, for example a Bluetooth and/or BLE receiver and/or a Bluetooth and/or BLE transceiver. The at least one radio transmission parameter may be an indication of a transmission power and/or a received signal strength of a radio signal transmitted by the at least one installed radio positioning support device. Using the received signal strength as radio transmission parameter may have the effect that it may be determined for any kind of transmitter. It may further have the effect that it may be measured at a receiving end without establishing any connection with the radio positioning support device. An indication of a received signal strength of a radio signal is for example a received signal strength indication (RSSI) or a physical Rx level in dBm with a reference value of 1 mW, etc. An indication of the transmission power used by a transmitter of the at least one installed radio positioning support device may be determined based on a received signal strength measured at a particular distance (e.g. a close distance such as less than 10 cm, preferable less than 5 cm) from the at least one installed radio positioning support device. Other possible radio transmission parameters may be an indication of a timing advance (TA), a path loss exponent or a round-trip time.

Alternatively or additionally, radio transmission parameter information representing the at least one radio transmission parameter of the at least one installed radio positioning support device may be received. For example, the radio transmission parameter information may be received by user input on the apparatus (e.g. by a user interface of the apparatus). In certain exemplary embodiments of the invention, the radio transmission parameter information may be received from the at least one installed radio positioning support device. For example, the radio transmission parameter information may be received by the apparatus (e.g. by a radio interface such as a Bluetooth and/or BLE receiver and/or a Bluetooth and/or BLE transceiver of the apparatus) in a signal (e.g. a radio signal) sent or triggered to be sent by the at least one positioning support device. Optionally, such a signal may comprise further data in addition to the radio transmission parameter information.

Determining the radio coverage model for the at least one installed radio positioning support device at least partially based on the at least one radio transmission parameter may be understood to mean that a parameter of a predetermined radio coverage model is determined and/or that a radio coverage model is selected from a set of predetermined radio coverage models at least partially based on this radio transmission parameter, for example a parameter of a geometric model may be determined (e.g. selected) based on this radio transmission parameter.

The parameters of a parametric radio model are for example at least partially determined based on the at least one radio transmission parameter, for example the radio transmission parameter (e.g. an indication of a transmission power) is used as a parameter value of a parametric radio model. Another parameter value of a parametric radio model may be determined at least partially based on the predetermined environment. For example, a path loss exponent highly depends on the environment and may thus be determined (e.g. selected) based on the predetermined environment. For example, the same path loss exponent is used for all radio coverage models in this predetermined environment. Typically, the path loss exponent is in the range of 2 to 4 (where 2 is for propagation in free space, and 4 is for relatively lossy environments). In certain predetermined environments, an even higher or lower path loss exponent may be used. If the path loss exponent is unknown, a path loss exponent in the range of 3 to 4 (e.g. 4) may be used. In certain exemplary embodiments of the invention, the path loss exponent may be part of a model of the predetermined environment.

According to an exemplary embodiment of the invention, the radio coverage model is a radio coverage model for the at least one installed radio positioning support device. For example, the radio coverage model describes (e.g. defines) an expected radio coverage of the at least one installed radio positioning support device.

In combination with the installation position of the at least one installed radio positioning support device, the radio coverage model may thus describe (e.g. define) an expected radio coverage of the at least one radio positioning support device in the predetermined environment within which radio signals send or triggered to be sent by the at least one radio positioning support device are expected to be observable (e.g. receivable with a minimum quality such as a minimum signal-to-noise ratio and/or a minimum signal power). The real radio coverage of the at least one installed radio positioning support device in the predetermined environment may however deviate from this expected radio coverage.

According to an exemplary embodiment of the invention, the one or more potential installation positions and/or areas are determined to be on or within a boundary defined by the radio coverage model.

The boundary of the radio coverage model may be understood to describe (e.g. define) an area such as an expected coverage area (and/or a spatial dimension) within which radio signals sent or triggered to be sent by a radio positioning support device installed at a (potential) installation position are expected to be observable (e.g. receivable with a minimum quality such as a minimum signal-to-noise ratio and/or a minimum signal power). Accordingly, the one or more potential installation positions and/or areas may be determined by the boundary relative to this (potential) installation position of the radio positioning support device. In combination with the installation position, the one or more potential installation positions and/or areas may for example be described (e.g. defined) relative to the predetermined embodiment.

If the one or more potential installation positions and/or areas are determined to be on or within such a boundary this may have the effect that the radio coverage of further positioning support devices installed at these potential installation positions and/or within these potential installation areas is expected to at least partially overlap with the radio coverage represented by the radio coverage model.

For example, the one or more potential installation positions are determined such that within the boundary defined by the radio coverage model positioning may be considered to be possible if radio positioning support devices having a similar radio coverage model are installed at the potential installation positions. As described above, positioning may be understood to be possible in a specific area of the predetermined environment if radio signals of a predetermined minimum number of radio positioning support devices are expected to be observable (e.g. receivable with a minimum quality such as a minimum signal-to-noise ratio and/or a minimum signal power) in this specific areas of the predetermined environment. Accordingly, radio coverage of a predetermined minimum number of radio positioning support devices overlap in this specific area of the predetermined environment.

According to an exemplary embodiment of the invention, the radio coverage model is one of or comprises one of:
a polygon;
a rectangle and/or a square;
a cuboid and/or a cube;
an ellipse and/or a circle; and
an ellipsoid and/or a sphere.

If the radio coverage model is one of or comprises one of these geometric shapes it is referred to as a geometric model of a radio coverage of a radio positioning support device installed at a (potential) installation position. Using such geometric models has the effect that the radio coverage model is very simple, only requires a small amount of data and is easy to analyze.

The (potential) installation position of the radio positioning support device may be within the geometric model, for example it may be at the center of the geometric model. The perimeter and/or the circumferences and/or the surface of the geometric model may for example describe (e.g. define) a boundary of an expected radio coverage (e.g. an area and/or a spatial dimension) of the radio positioning support device within which radio signals sent or triggered to be sent by the radio positioning support device are expected to be observable (e.g. receivable with a minimum quality such as a minimum signal-to-noise ratio and/or a minimum signal power). Outside of the perimeter and/or the circumferences and/or the surface, radio signals sent or triggered to be sent by the radio positioning support device are for example expected to be not observable (e.g. only receivable with a quality less than a minimum quality such as a minimum signal-to-noise ratio and/or a minimum signal power).

As described above, a parameter of a geometric model may be at least partially determined (e.g. selected) based on one or more radio transmission parameters of a radio positioning support device. Examples of such parameters are a diameter, a radius and/or an edge length of the geometric model. For example, the parameter of the geometric model may be selected from a list of parameters according to a predetermined mapping with one or more radio transmission parameter. For example, an edge length of 16 m is selected for a square as geometric model of a radio coverage of a radio positioning support device having a transmission power of 0 dBm and a path loss exponent of 4.

Alternatively or additionally, information representing a parameter of a geometric model (e.g. a diameter, a radius and/or an edge length of the geometric model) may be received by the apparatus (e.g. by user input on the apparatus). As described above, the parameter of the geometric model may be determined to be equal to the parameter represented by the received information in this case.

In certain exemplary embodiments of the invention, a predetermined value (e.g. a default value) may be used and/or selected as a parameter of a geometric model, for example in cases where no user input is received and/or where no user input is required. For example, an edge length of 10 m may be used as parameter for a square as geometric model.

According to an exemplary embodiment of the invention, the at least one installation position is one of a plurality of installation positions of a plurality of installed radio positioning support devices, wherein the one or more potential installation positions and/or areas are determined at least partially based on the plurality of installation positions and a plurality of radio coverage models for the plurality of installed radio positioning support devices. For example, the method according to the invention may be an iterative method the actions of which are repeated for every installation position of the plurality of installation positions of the plurality of installed radio positioning support devices.

In certain exemplary embodiments of the invention, the same radio coverage model is used for each radio positioning support device of the plurality of radio positioning support devices, for example if the radio positioning support device of the plurality of radio positioning support devices have the same radio transmission parameter(s) (e.g. the same transmission power and/or the same path loss exponent).

Additionally, the method may further comprise determining whether one or more installed radio positioning support devices of the plurality of installed radio positioning support devices are observable at one or more specific positions and/or within one or more specific areas of the predetermined environment at least partially based on the plurality of installation positions and the plurality of radio coverage models.

For example, a specific position and/or a specific area of the predetermined environment is only determined to be a potential installation position and/or area if it is determined that less than a predetermined number of installed radio positioning support devices of the plurality of installed radio positioning support devices are observable at the specific position and/or within the specific area.

Each specific area of the predetermined environment may represent a specific expected radio coverage of one or more installed beacons of the plurality of installed beacons in the respective specific area. As described above, positioning based on radio positioning support devices may be possible in a specific area of the predetermined environment if radio signals of a predetermined minimum number of radio positioning support devices are expected to be observable (e.g. receivable with a minimum quality such as a minimum signal-to-noise ratio and/or a minimum signal power) in this specific area of the predetermined environment. Accordingly, it may only be necessary to install further radio positioning support devices at a specific position and/or within a specific area if it is determined that less than such a predetermined number of installed radio positioning support devices of the plurality of installed radio positioning support devices are observable at the specific position and/or within the specific area. Alternatively or additionally, the specific positions and/or the specific areas may be rated based on the number of installed radio positioning support devices of the plurality of installed radio positioning support devices are observable at the specific position and/or within the specific area.

According to an exemplary embodiment of the invention, the method further comprises providing installation information representing the one or more potential installation positions and/or areas.

The installation information may comprise position information of each of the one or more potential installation positions and/or area information of each of the one or more potential installation areas. For example, position information of one of the one or more potential installation positions describe (e.g. define) the position of this potential installation position relative to the predetermined environment, for example by horizontal distance(s) and/or vertical distance(s) to one or more fixed objects and/or features (e.g. a wall, a floor, a ceiling, a corner, a door opening, a window opening, etc.) of the predetermined environment. Similarly, area information of one of the one or more potential installation areas may describe the location of the area relative to the predetermined environment, for example by horizontal distances and/or vertical distances to such a fixed object and/or feature. Alternatively and/or additionally, the installation information may comprise absolute position information such as geographic coordinates describing (e.g. defining) the one or more potential installation positions and/or areas.

In certain exemplary embodiments of the invention, the providing the installation information representing the one or more potential installation positions and/or areas comprises displaying the installation information on a user interface (e.g. a user interface of the apparatus). For example, position information as described above may be displayed on the user interface. Alternatively or additionally, a graphical model of the predetermined environment with an indication of the one or more potential installation positions and/or areas may be displayed on the user interface, for example the one or more potential installation positions and/or areas may be indicated by graphical features (e.g. symbols, hatchings, colors, etc.) at corresponding positions and/or areas in the graphical model of the predetermined environment. As described above, examples of a two-dimensional graphical model of the predetermined environment are a map, a floor plan, etc.

According to an exemplary embodiment of the invention, the method further comprises providing installation information representing a number of the one or more potential installation positions and/or areas. For example, the providing the installation information representing the number of the one or more potential installation positions and/or areas comprises displaying the installation information on a user interface (e.g. a user interface of the apparatus).

According to an exemplary embodiment of the invention, a computer program code is presented, the computer program code when executed by a processor causing an apparatus to perform the actions of the method according to the invention.

According to an exemplary embodiment of the invention, a computer readable storage medium (e.g. a tangible and/or non-transitory computer readable storage medium) is presented, in which the computer program code according to invention is stored.

According to an exemplary embodiment of the invention, an apparatus is presented, which comprises means for performing the method according to the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a positioning sensor as described above (e.g. a distance measurement sensor such as a laser distance measurement sensor), a communication interface, a network interface, a radio interface as described above (e.g. a receiver, a transmitter and/or a transceiver such as a Bluetooth receiver, transmitter and/or transceiver and/or a BLE receiver, transmitter and/or transceiver), a data interface, a user interface (e.g. a touch-sensitive display, a keyboard, a touchpad, a display, etc.) etc.

For example, the apparatus comprises at least one processor and at least one memory including computer program code, the at least one memory and the computer program code configured to, with the at least one processor, cause an apparatus at least to perform at least partially the method and/or the steps of the method according to the first aspect of the invention.

According to an exemplary embodiment of the invention, a system is presented, comprising an apparatus according to the invention and at least one installed radio positioning support device. The system may be a positioning system of a positioning solution, for example a positioning system of a positioning solution in the installation stage.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1a is a block diagram of an exemplary embodiment of an apparatus according to the invention. In the following, it is assumed that the apparatus is a mobile device 100. For instance, the mobile device 100 is or forms a part (e.g. as a module) of a mobile user device such as a smartphone, a tablet computer, a notebook computer, a smart watch or a smart band, etc.

Figure 1A:
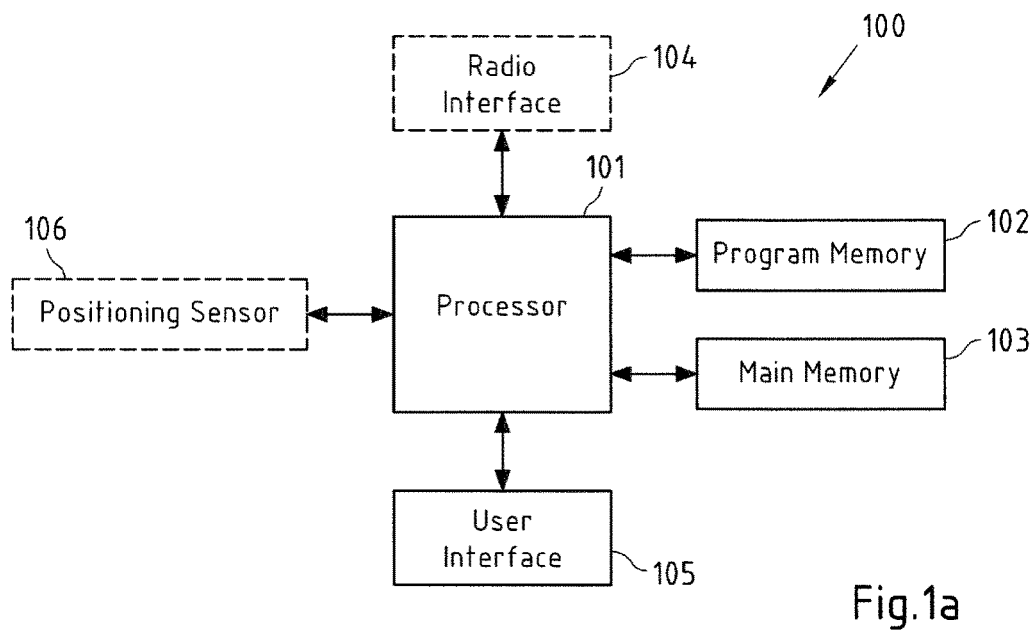
FIG. 1a is a block diagram of an exemplary embodiment of an apparatus according to the invention.

Mobile device 100 comprises a processor 101. Processor 101 may represent a single processor or two or more processors, which are for instance at least partially coupled, for instance via a bus. Processor 101 executes a program code stored in program memory 102 (for instance program code causing mobile device 100 to perform one or more of the embodiments of a method (or parts thereof) according to the invention (as for instance further described below with reference to FIGS. 2a and 2b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in mobile device 100, and a second memory portion that is removable from mobile device 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls an optional radio interface 104 configured to receive and/or output data and/or information. For instance, radio interface 104 may be configured to receive radio signals from a beacon (e.g. beacon 200 as described below with respect to FIG. 1b). For this, the radio interface 104 may at least comprise a BLE component including at least a BLE receiver (RX). It is to be understood that the BLE receiver may also be a part of a BLE transceiver. The BLE component is configured to scan for radio signals that are broadcast by BLE beacons such as beacon 200 as described below with respect to FIG. 1b, to extract advertising data contained in detected BLE signals. Furthermore, the BLE component may be configured to evaluate received radio signals such as determining a received signal strength of a received radio signal. It is to be understood that any computer program code based processing required for receiving and evaluating BLE signals may be stored in an own memory of the BLE component and executed by an own processor of the BLE component, or it may be stored for example in memory 103 and executed for example by processor 101.

Optionally, mobile device 100 may comprise further communication interfaces, for example one or more communication interfaces configured to allow communication according to a 2G/3G/4G/5G cellular communication system and/or a non-cellular communication system, such as for instance a WLAN network.

Processor 101 further controls a user interface 105 configured to present information to a user of mobile device 100 and/or to receive information from such a user. User interface 105 may for instance be the standard user interface via which a user of mobile device 100 controls other functionality thereof, such as making phone calls, browsing the Internet, etc. Examples of such a user interface are a touch-sensitive display, a keyboard, a touchpad, a display, etc.

Processor 101 may further control an optional positioning sensor 106. The positioning sensor 106 may be configured to fully-automatically measure horizontal distances in at least two orthogonal directions to (fixed) objects and/or features next to the positioning sensor. For example, the positioning sensor may be an optical distance measurement sensor such as a laser distance measurement sensor.

The components 102-106 of mobile device 2 may for instance be connected with processor 101 by means of one or more serial and/or parallel busses.

It is to be understood that mobile device 100 may comprise various other components.

Figure 1B:
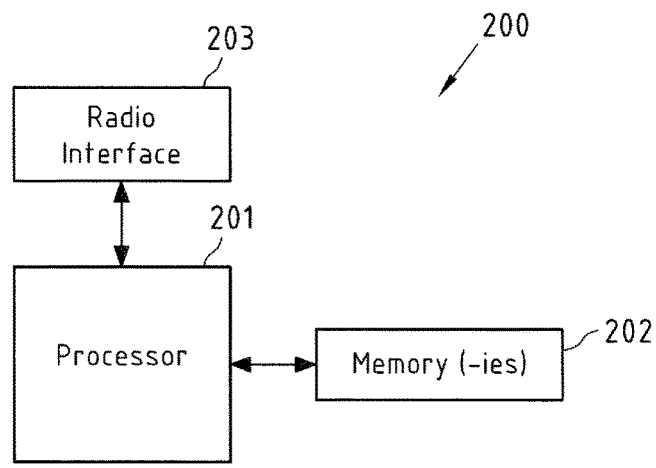
FIG. 1b is a block diagram of an exemplary embodiment of a radio positioning support device according to the invention.

FIG. 1b is a block diagram of an exemplary embodiment of a radio positioning support device according to the invention. In the following, it is assumed that the radio positioning support device is a beacon 200.

Beacon 200 comprises a processor 201. Processor 201 may represent a single processor or two or more processors, which are for instance at least partially coupled, for instance via a bus. Processor 201 executes a program code stored in memory 202. Some or all of memory 202 may also be included into processor 201. Memory 202 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 201 when executing an operating system and/or programs. Memory 202 may also comprise an operating system for processor 201. Memory 202 may for instance comprise a first memory portion that is fixedly installed in beacon 200, and a second memory portion that is removable from beacon 200, for instance in the form of a removable SD memory card.

Processor 201 further controls a radio interface 203 configured to receive and/or output data and/or information. For instance, radio interface 203 may at least comprise a BLE component including a BLE transmitter (TX). The radio interface 203 may additionally comprise a BLE receiver (RX). The transmitter and receiver may also be part of a BLE transceiver (TRX). The BLE transmitter enables beacon 200 to send radio signals in line with any current or future version of the Bluetooth standard supporting a low energy mode. Likewise, the BLE receiver enables beacon 200 to receive radio signals in line with any current or future version of the Bluetooth standard supporting a low energy mode.

Accordingly, beacon 200 may be a Bluetooth beacon, a Bluetooth beacon enabling Bluetooth low energy mode, and a Bluetooth low energy beacon.

It is to be understood that beacon 200 may comprise various other components.

Figure 1C:
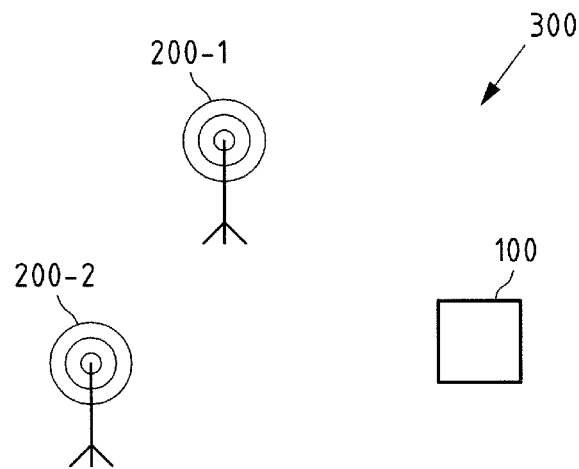
FIG. 1c is a block diagram of an exemplary embodiment of a system according to the invention.

FIG. 1c is a block diagram of an exemplary embodiment of a system 300 according to the invention.

System 300 at least partially illustrates a positioning system of a positioning solution for a predetermined indoor environment such as a building and/or a complex of buildings (e.g. a shopping center, a parking garage, an airport, a company site, etc.) in the installation stage. System 300 comprises beacons 200-1 and 200-2 which have already been installed in the predetermined environment. Beacons 200-1 and 200-2 may correspond to beacon 200 as described above with respect to FIG. 1b. Optionally, system 300 may comprise further beacons. In the following, reference is made only to beacons 200-1 and 200-2 without limiting the scope of the invention. Furthermore, system 300 comprises mobile device 100 as described above with respect to FIG. 1a.

Beacons 200-1 and 200-2 automatically and repeatedly send radio signals comprising positioning support data. The positioning support data are configured to enable one or more mobile devices such as mobile device 100 receiving the positioning support data to determine their position at least partially based on these positioning support data. For example, beacons 200-1 and 200-2 may be beacons of a plurality of beacons that are installed during the installation stage in the predetermined environment. Adjacent beacons of this plurality of beacons may automatically and repeatedly send radio signal comprising positioning support data. Accordingly, beacons 200-1 and 200-2 may for example be adjacent beacons of such a plurality of beacons.

In system 300, mobile device 100 may be configured to receive signals from beacons 200-1 and 200-2, as the beacons 200-1 and 200-2 provide radio coverage in the area of the mobile device 100. However, at different positions within the radio coverage of the respective beacon 200-1 and 200-2, the mobile device 100 may for example observe and/or measure different received signal strengths (RSS). This may allow mobile device 100 to obtain observation information representative of at least one characteristic of at least one signal (e.g. the signal from beacon 200-1 or 200-2) at a particular position of the mobile device. As already described, non-limiting examples of a beacon such as beacons 200-1 and 200-2 may be a Bluetooth beacon, a Bluetooth beacon enabling Bluetooth low energy mode, and a Bluetooth low energy beacon.

Figure 2A:
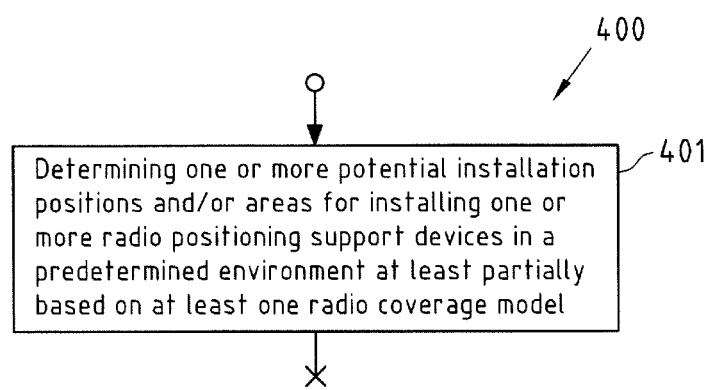
FIGS. 2a-2b are flow charts illustrating exemplary embodiments of a method according to the invention.

FIG. 2a is a flow chart 400 illustrating an exemplary embodiment of a method according to the invention.

An apparatus according to the invention such as mobile device 100 determines one or more potential installation positions and/or areas for installing one or more radio positioning support devices in a predetermined environment at least partially based on at least one radio coverage model (action 401). The radio positioning support devices may correspond to beacon 200 as described above with respect to FIG. 1b.

For example, the predetermined environment is a predetermined indoor environment such as a building and/or a complex of buildings (e.g. a shopping center, a parking garage, an airport, a company site, etc.) in which a positioning system is to be installed. The potential installation positions may describe positions in this predetermined environment at which radio positioning support devices may be installed; and the potential installation areas may describe areas in this predetermined environment in which radio positioning support devices may be installed. The potential installation positions and/or areas may be understood to be proposals for installation of radio positioning support devices. If a potential installation position and/or area is for example inaccessible, the potential installation position and/or area may be skipped (e.g. ignored) and/or a radio positioning support device may be installed at an accessible location close to this potential installation position and/or area.

As described above, a radio coverage model may represent an estimate of a two-dimensional or a three-dimensional coverage map. It may describe (e.g. define) the expected radio coverage (e.g. an expected coverage area) of a radio positioning support device such as beacon 200 within which radio signals send or triggered to be sent by the radio positioning support device installed at a (potential) installation position are expected to be observable (e.g. receivable with a minimum quality such as a minimum signal-to-noise ratio and/or a minimum signal power). The real radio coverage of the radio positioning support device may however deviate from such an expected radio coverage.

In action 401, the one or more potential installation positions and/or areas are for example determined at least partially based on the at least one radio coverage model such that it is expected that positioning (i.e. position determining) based on the one or more radio positioning support devices at least in a specific area of the predetermined environment is possible if the one or more radio positioning support devices are installed at the one or more potential installation positions and/or within the one or more potential installation areas. Positioning based on the one or more radio positioning support devices at least in a specific area of the predetermined environment may be understood to be possible if radio signals of a predetermined minimum number of radio positioning support devices are expected to be observable (e.g. receivable with a minimum quality such as a minimum signal-to-noise ratio and/or a minimum signal power) in this specific area of the predetermined environment.

Figure 2B:
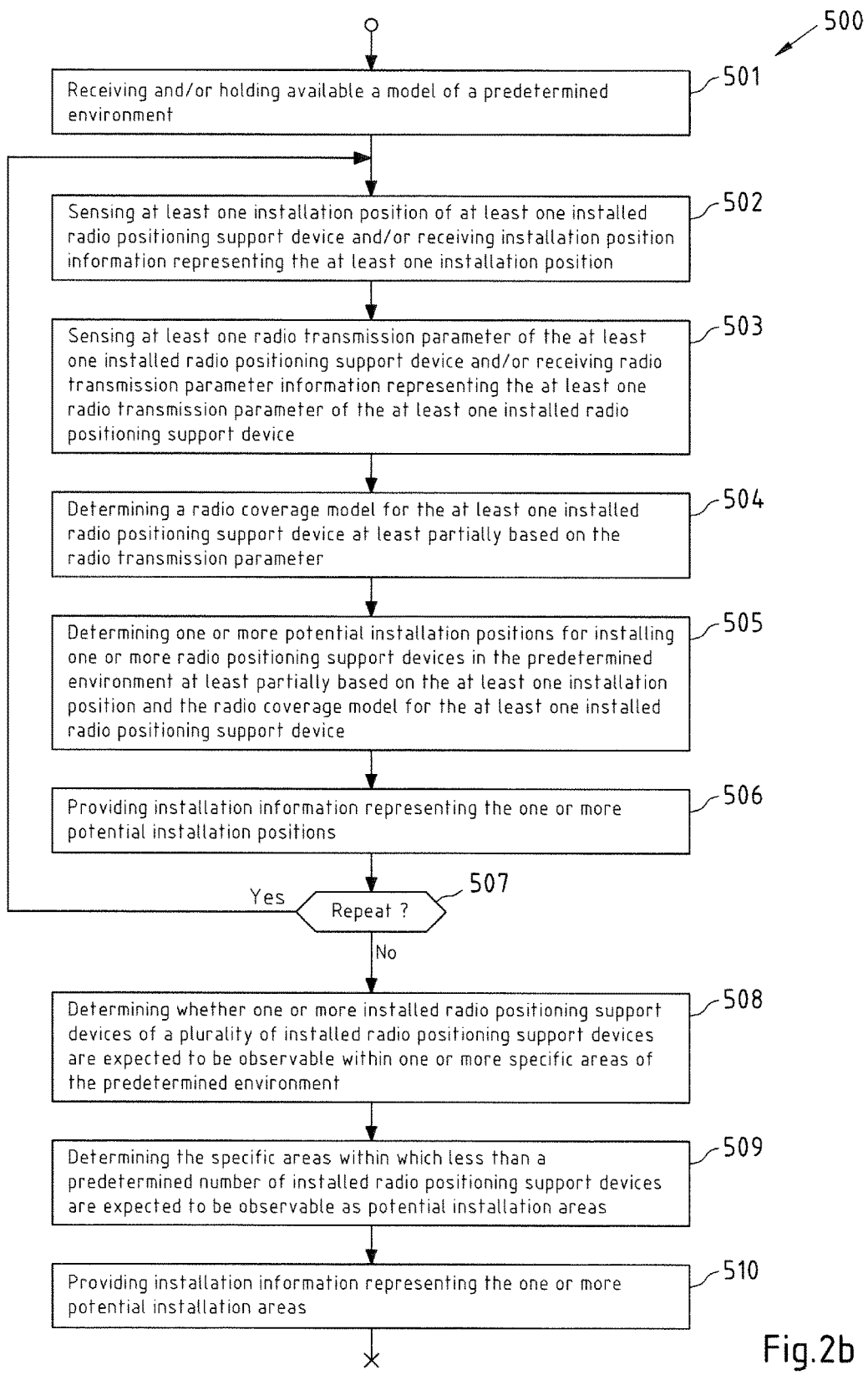

FIG. 2b is a flow chart 500 illustrating another exemplary embodiment of a method according to the invention. The actions of flow chart 500 may be performed by mobile device 100, for example. In the following, it is assumed that processor 101 and the program code stored in memory 102 of mobile device 100 may cause the mobile device 100 to perform all or some of actions 501 to 510 when program code is retrieved from memory 102 and executed by processor 101. Furthermore, it is assumed that mobile device 100 is part of system 300 described above with respect to FIG. 1c and that the positioning support devices correspond to beacon 200 as described above with respect to FIG. 1b.

Mobile device 100 receives a two-dimensional graphical model of a predetermined indoor environment such as a building and/or a complex of buildings (e.g. a shopping center, a parking garage, an airport, a company site, etc.) in which a positioning system is to be installed (action 501). In the following it is assumed that the two-dimensional graphical model of the predetermined indoor environment is a floor map. It may be received by user input on user interface 105.

Alternatively or additionally, data representing the model of the predetermined indoor environment may be received by mobile device 100 (e.g. by radio interface 104 or another communication interface of mobile device 100). For example, a radio signal comprising the data representing the graphical model of the predetermined indoor environment is received by mobile device and, subsequently, the data representing the graphical model of the predetermined indoor environment are extracted from the received signal.

The graphical model of the predetermined indoor environment may be configured for displaying on the user interface 105.

Action 501 may be optionally. In other embodiments, no or a different model of the predetermined indoor environment may be received at the mobile device 100.

The following actions 502 to 506 may be repeated when a new beacon has been installed in the predetermined indoor environment. In the following, it is assumed that the installed radio positioning support devices corresponds to beacon 200-1 which has been installed in the predetermined indoor environment.

In action 502, the installation position at least of beacon 200-1 is sensed by mobile device 100. Alternatively or additionally, installation position information representing the installation position at least of beacon 200-1 is received by the mobile device.

For example, positioning sensor 106 is used for sensing (e.g. measuring) the installation position of beacon 200-1. As described above, positioning sensor 106 may be a distance measurement sensor configured to fully-automatically measure horizontal distances in at least two orthogonal directions to (fixed) objects and/or features next to the positioning sensor. Accordingly, positioning sensor may be placed at the installation position of beacon 200-1 and the measurement (e.g. the sensing) may be initiated by the user (e.g. by user input on user interface 105). In certain embodiments, the two measured horizontal distances to (fixed) objects and/or features (e.g. a wall, a corner, a door opening, a window opening, etc.) of the predetermined indoor environment may be sufficient to describe (e.g. define) the installation position relative to the predetermined indoor environment, in particular sufficient for describing (e.g. defining) the installation position in a two-dimensional graphical model of the predetermined indoor environment. If the model of the predetermined indoor environment is a three-dimensional model it may be necessary to also measure a vertical distance to describe (e.g. define) the installation position in this model. Also, additional information (e.g. information on the room in which beacon 200-1 has been installed) may be necessary to sufficiently describe (e.g. define) the installation position relative to the predetermined indoor environment. This information may for example be received by user input on user interface 105 of mobile device 100.

In other embodiments, position information representing the installation position of beacon 200-1 is received by mobile device 100 without sensing this position by the mobile device 100. To this end, the position information representing the installation position of beacon 200-1 may be received by user input on user interface 105 of mobile device 100. Alternatively or additionally, the position information may be received by radio interface 104 or another communication interface of mobile device 100. For example, a radio signal comprising the position information is received by mobile device 100 and, subsequently, the position information is extracted from the received signal.

Optionally, position information representing the installation position of beacon 200-1 (e.g. the received position information and/or position information comprising the measured distances) may be stored in memory 102 of mobile device 100.

Mobile device 200 senses at least one radio transmission parameter of beacon 200-1 and/or receives a radio transmission parameter information representing the at least one radio transmission parameter of beacon 200 (action 503).

Examples of a radio transmission parameter are an indication of a received signal strength or a physical Rx level or an indication of a transmission power. Other possible radio transmission parameters may be an indication of a timing advance (TA), a path loss exponent or a round-trip time.

The at least one radio transmission parameter may be sensed (e.g. measured) by radio interface 104 of mobile device 100. For example, mobile device 100 senses a received signal strength of a radio signal send by beacon 200-1 and received by radio interface 104. As described above, the at least one radio transmission parameter may be an indication of such a received signal strength. An indication of a received signal strength is for example a received signal strength indication (RSSI) or a physical Rx level in dBm with a reference value of 1 mW, etc. Based on a received signal strength measured at a particular distance (e.g. a close distance) from beacon 200-1, an indication of the transmission power used by radio interface 203 of beacon 200-1 may be determined. In certain embodiments, the at least one radio transmission parameter may be an indication of such a transmission power.

Alternatively or additionally, radio transmission parameter information representing the at least one radio transmission parameter of beacon 200-1 may be received by mobile device 100. For example, the radio transmission parameter information may be received by user input on user interface 105 of mobile device 100. In certain embodiments, the radio transmission parameter information may be received by radio interface 104 or another communication interface of mobile device 100. For example, a radio signal transmitted by beacon 200-1 comprising radio transmission parameter information (e.g. an indication of the transmission power) is received by mobile device 100 and, subsequently, the radio transmission parameter information are extracted from the received signal. Optionally, such a signal may comprise further radio positioning support data (e.g. installation position information representing the installation position of the radio positioning support device) in addition to the radio transmission parameter information.

Optionally, radio transmission parameter information representing the radio transmission parameter of beacon 200-1 (e.g. the received radio transmission parameter information and/or radio transmission parameter information comprising an indication of a measured received signal strength and/or an indication of a determined transmission power) may be stored in memory 102 of mobile device 100.

At least partially based on the radio transmission parameter, mobile device 100 determines a radio coverage model for beacon 200-1 (action 504). As described above, a radio coverage model may be a hard-boundary model or a soft-boundary model. An example for a soft-boundary radio coverage model may be a parametric radio model. An example for a hard-boundary radio coverage model may be a geometric model.

Figure 3A:
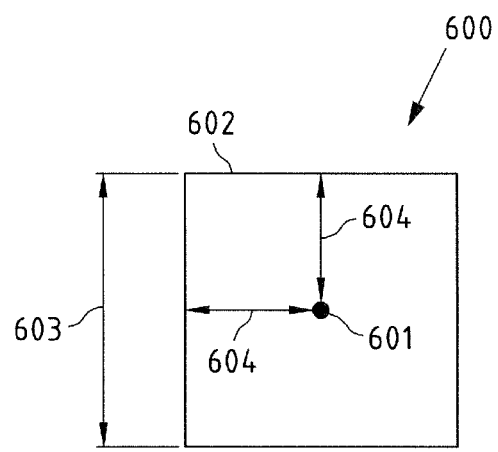
FIGS. 3a-3b show exemplary radio coverage models according to the invention.
Figure 3B:
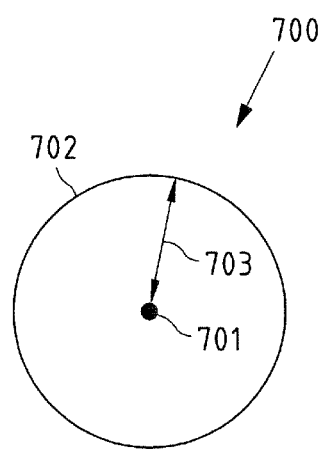

FIGS. 3a and 3b show exemplary radio coverage models 600 and 700 which are geometric models. Radio coverage model 600 of FIG. 3a is a square with center 601, perimeter 602 and edge length 603. Furthermore the shortest distance 604 between the center 601 and the perimeter 602 is illustrated in FIG. 3a. Radio coverage model 700 of FIG. 3b is a circle with center 701, circumference 702 and radius 703. In order to serve as a radio coverage model for a radio positioning support device, certain parameter(s) such as the edge length 603 or the diameter 703 of these geometric models 600 and 700 may be determined such that the perimeter 602 and the circumference 702 define a boundary (e.g. a boundary of an area) within which radio signals sent or triggered to be sent by the radio positioning support device (e.g. beacon 200-1) positioned at center 601 are expected to be observable (e.g. receivable with a minimum quality such as a minimum signal-to-noise ratio and/or a minimum signal power).

For example, the parameter of the geometric model may be selected from a list of parameters according to a predetermined mapping with one or more radio transmission parameter. For example, edge length 603 is to be selected to be 16 m for a radio positioning support device having a transmission power of 0 dBm and a path loss exponent of 4 according to such a mapping. Typically, the path loss exponent is in the range of 2 to 4 (where 2 is for propagation in free space, and 4 is for relatively lossy environments). In certain predetermined environments, an even higher or lower path loss exponent may be used. If the path loss exponent is unknown, a path loss exponent in the range of 3 to 4 (e.g. 4) may be used. In certain exemplary embodiments of the invention, the path loss exponent may be part of a model of the predetermined environment.

If the parameter(s) of these geometric models 600 and 700 are determined at least partially based on one or more radio parameters of the positioning support device, this may have the effect that for different radio positioning support devices having different radio transmission parameters different parameters may be used.

Optionally, radio coverage model information representing the radio coverage model of beacon 200-1 determined in action 504 may be stored in memory 102 of mobile device 100.

In the following, it is assumed that the radio coverage model for beacon 200-1 determined in action 504 is geometric model 600 (e.g. with an edge length 603 of 16 m).

At least partially based on the installation position of beacon 200-1 (i.e. the installation position sensed in action 502 and/or represented by the installation position information received in action 602) and the radio coverage model for beacon 200-1 (i.e. geometric model 600 as determined in action 504), mobile device 100 determines one or more potential installation positions for installing one or more radio positioning support devices in the predetermined indoor environment (action 505).

The one or more potential installation positions may be determined to be on a boundary defined by the radio coverage model for beacon 200-1. For example, the one or more potential installation positions may be positions on perimeter 602 of geometric model 600 if geometric model 600 has been determined as radio coverage model for beacon 200-1 as assumed above. The center 601 of geometric model 600 corresponds to the installation position of beacon 200-1. Accordingly, geometric model 600 in combination with position information representing the installation position of beacon 200-1 sensed and/or the position information received in action 502 (e.g. the position information stored in memory 102 of mobile device 100) at least partially describes (e.g. defines) these positions relative to the predetermined indoor environment. In certain embodiments, certain positions on perimeter 602 of geometric model 600 such as the vertices and/or the centers of the edges of the square may be determined to be the one or more potential installation positions. This may have the effect that the radio coverage of further positioning support devices (e.g. beacons 200) installed at these potential installation positions are evenly distributed and expected to at least partially overlap with the radio coverage represented by the radio coverage model.

Subsequently, installation information representing the one or more potential installation positions is provided (action 506).

The installation information may be provided by displaying on user interface 105 of mobile device. For example, the displayed installation information may comprise position information of each of the one or more potential installation positions. For example, position information of one of the one or more potential installation positions describe (e.g. define) the position of this potential installation position relative to the predetermined environment, for example by horizontal distance(s) to one or more fixed objects and/or features (e.g. a wall, a floor, a ceiling, a corner, a door opening, a window opening, etc.) of the predetermined environment.

Alternatively or additionally, the installation information may be provided by displaying the graphical model of the predetermined indoor environment received in action 501 with indications of the positions of the one or more potential installation positions on the user interface 105 of mobile device 100, for example, the one or more potential installation positions may be indicated by graphical features (e.g. symbols, hatchings, colors, etc.) at corresponding positions in the graphical model of the predetermined indoor environment.

Figure 4A:
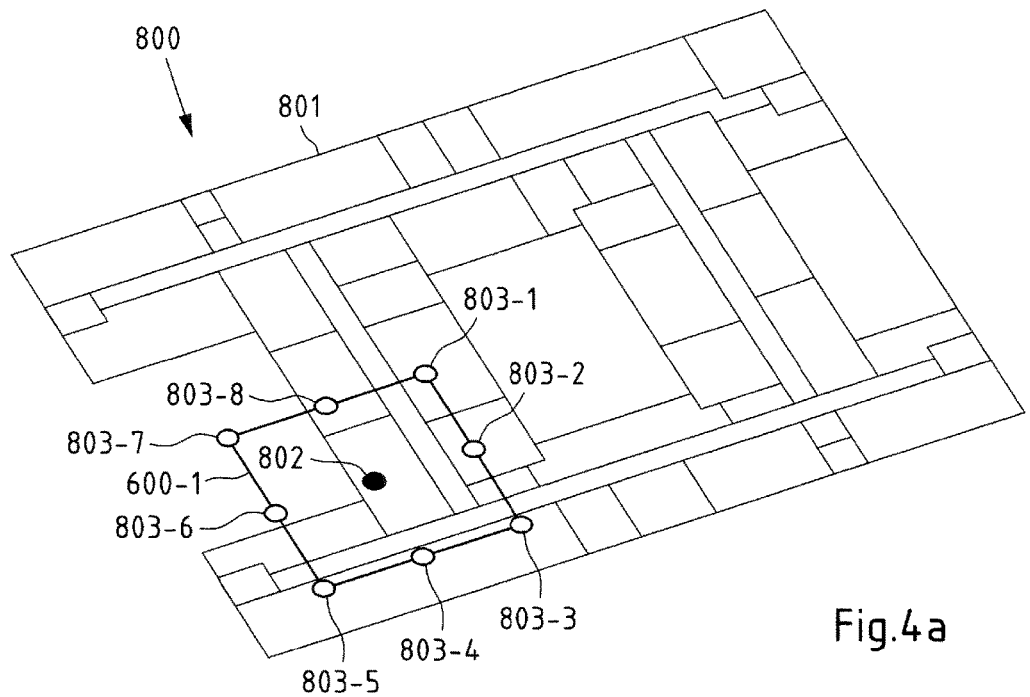
FIGS. 4a-4c show exemplary embodiments of user interface displays according to the invention.

FIG. 4a shows an exemplary embodiment of such an user interface display 800. The graphical model of the predetermined indoor environment is depicted as floor map 801 in FIG. 4a. The installation position of beacon 200-1 in the predetermined indoor environment is indicated by symbol 802 which is in the center of geometric model 600-1. This geometric model 600-1 corresponds to geometric model 600 as determined in step 504 and indicates the expected radio coverage of beacon 200-1 in the predetermined indoor environment. The potential installation positions are indicated by symbols 803-1 to 803-8 at the vertices and the centers of the edges of geometric model 600-1.

In action 507, it is determined whether actions 502 to 506 are to be repeated (e.g. based on user input on user interface 105 of mobile device 100). As described above, these actions may be repeated when a new beacon has been installed in the predetermined indoor environment. In this case, actions 502 to 505 may be repeated for this newly installed beacon and the installation information provided in action 506 may be accordingly updated.

Figure 4B:
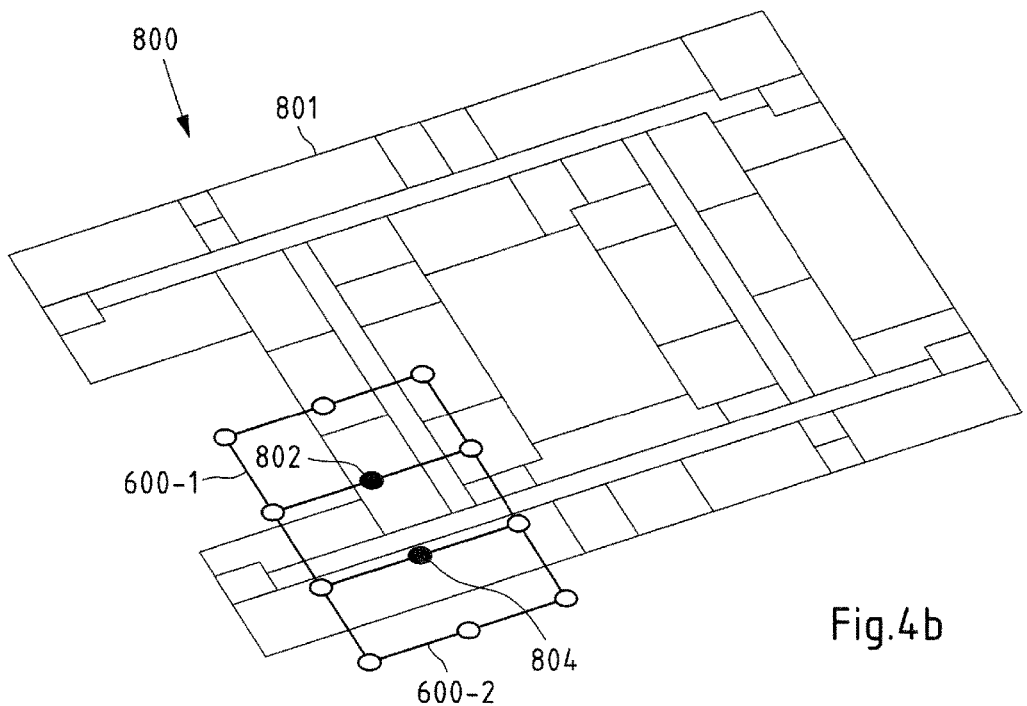
Figure 4C:
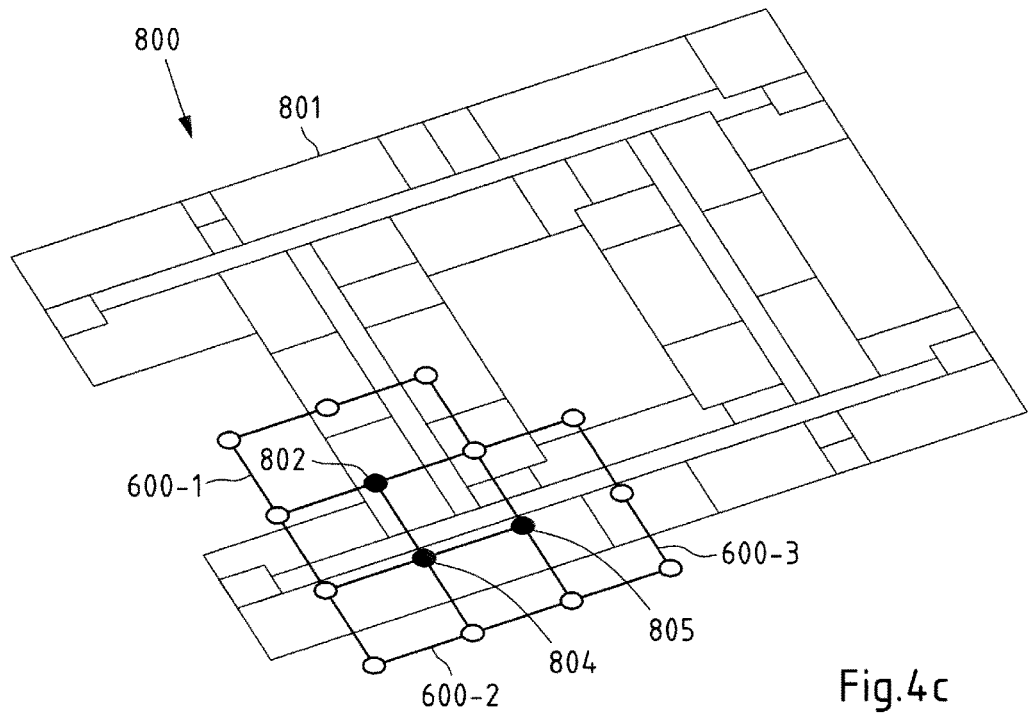

FIGS. 4b and 4c show exemplary embodiments of updated user interface displays 800 which may be displayed in action 506 after the first repetition (i.e. FIG. 4b) and the second repetition (i.e. FIG. 4c). The same reference signs in FIGS. 4a to 4c are used for the same features. In FIG. 4b, the installation position of a newly installed beacon (e.g. beacon 200-2) in the predetermined indoor environment is indicated by symbol 804 which is in the center of geometric model 600-2. This geometric model 600-2 corresponds to a geometric model 600 as determined in repeated step 504 for this newly installed beacon and indicates the expected radio coverage thereof in the predetermined indoor environment. In FIG. 4c, the installation position of a further newly installed beacon in the predetermined indoor environment is indicated by symbol 805 which is in the center of geometric model 600-3. This geometric model 600-3 corresponds to a geometric model 600 as determined in repeated step 504 for this further newly installed beacon and indicates the expected radio coverage thereof in the predetermined indoor environment. The potential installation positions are indicated by the symbols in FIGS. 4b and 4c (no reference signs for better readability) which correspond to symbols 803-1 to 803-8 in FIG. 4a. Models 600-1, 600-2 and 600-3 may be equal if the beacons (e.g. beacons 200-1 and 200-2) have the same radio transmission parameter(s).

If it is determined in action 507 that actions 502 to 506 are not to be repeated (e.g. by user input on user interface 105 of mobile device 100), flow chart 500 may continue with determining whether one or more installed beacons of a plurality of beacons (e.g. beacons 200-1 and 200-2) are expected to be observable within one or more specific areas of the predetermined indoor environment (action 508). In the following, it is assumed that for each of the one or more installed beacons of the plurality of beacons actions 502 to 506 have been performed.

For example, the specific areas are sub-areas of the area covered by the predetermined indoor environment. Each specific area of the predetermined environment may represent a specific expected radio coverage of one or more installed beacons of the plurality of installed beacons in the respective specific area. For example, an area in which only radio coverage of a first beacon (e.g. beacon 200-1) is expected may be a first specific area, an area in which only radio coverage of a second beacon (e.g. beacon 200-2) is expected may be a second specific area, an area in which radio coverage of the first beacon and the second beacon (e.g. beacons 200-1 and 200-2) is expected may be a third specific area, and so forth. Accordingly, the specific areas may be determined at least partially based on the radio coverage models determined in action(s) 505 for the plurality of beacons.

Subsequently, mobile device 100 determines the specific areas within which less than a predetermined number of installed beacons are expected to be observable as potential installation areas (action 509). In an alternative embodiment, actions 508 and 509 may be performed in a single action.

The predetermined minimum number of installed beacons may be selected such that positioning based on beacons (e.g. beacons 200) may be considered to be possible in a specific area of the predetermined indoor environment if radio signals of this predetermined minimum number of beacons are expected to be observable (e.g. receivable with a minimum quality such as a minimum signal-to-noise ratio and/or a minimum signal power) in this specific area of the predetermined environment. Typically, positioning based on beacons is possible if radio signals of at least three or four beacons are observable (e.g. receivable with a minimum quality such as a minimum signal-to-noise ratio and/or a minimum signal power). This may have the effect that only specific areas are determined to be potential installation areas within which a positioning is considered to be not possible due to a lack of radio coverage of one or more beacons.

Alternatively or additionally, the specific areas may be rated based on the number of installed beacons of the plurality of installed beacons which are observable within the specific area. This rating may be an indication of the completeness and/or quality of the positioning system comprising the plurality of beacons.

Providing installation information representing the one or more potential installation areas (action 510)

Subsequently, installation information representing the one or more potential installation areas are provided. For example, the installation information may be provided by displaying the graphical model of the predetermined indoor environment received in action 501 with an indication of the potential installation areas and/or an indication of the rated specific areas on the user interface 105 of mobile device 100, for example the potential installation areas and/or the rated specific areas are indicated by graphical features (e.g. hatchings, colors, etc.) in corresponding areas in the graphical model of the predetermined indoor environment.

Figure 5:
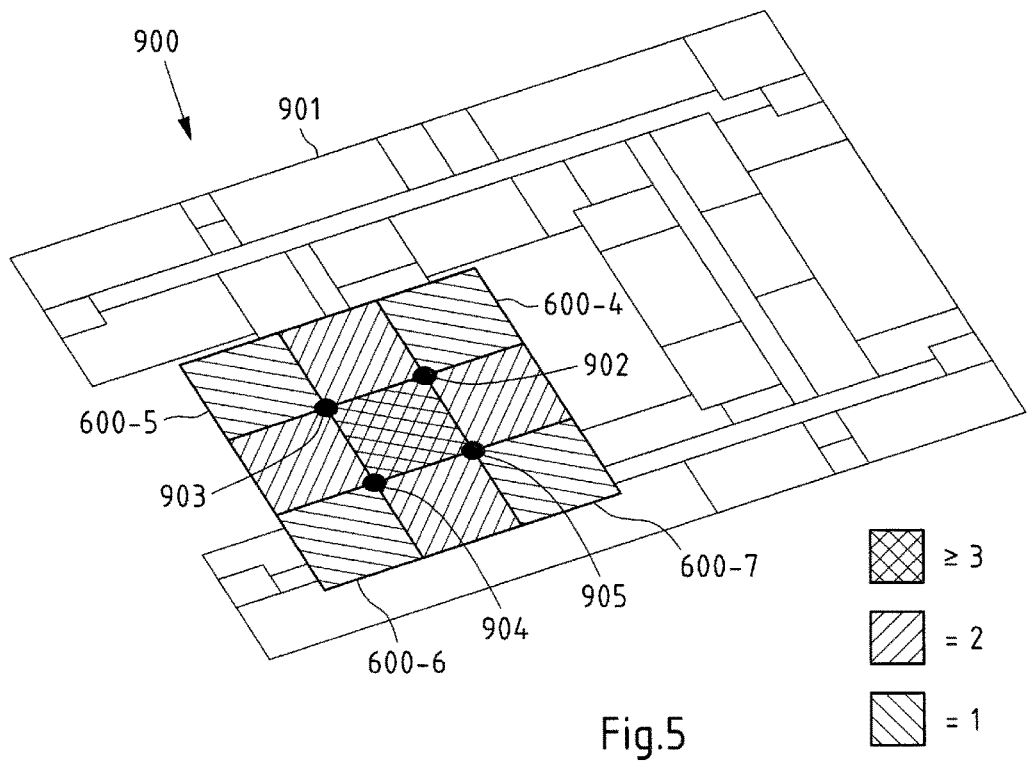
FIG. 5 shows another exemplary embodiment of an user interface display according to the invention.

FIG. 5 shows an exemplary embodiment of such an user interface display 900. The graphical model of the predetermined indoor environment is depicted as floor map 901 in FIG. 5. The installation positions of four beacons in the predetermined indoor environment are indicated by symbols 902 to 905 each of which is in the center of one of geometric models 600-4 to 600-7. These geometric models 600-4 to 600-7 correspond to geometric model(s) 600 as determined in action(s) 505 for each of the four beacons and indicate their expected radio coverages. Different specific areas with different specific expected radio coverages of the four beacons are indicated by different hatchings in FIG. 5. As can be seen from the legend included in FIG. 5, the cross-hatched area indicates one specific area within which radio signals of at least three beacons are expected to be observable (e.g. receivable with a minimum quality such as a minimum signal-to-noise ratio and/or a minimum signal power). Within the other specific areas less than three beacons are expected to be observable (e.g. receivable with a minimum quality such as a minimum signal-to-noise ratio and/or a minimum signal power).

Figure 6:
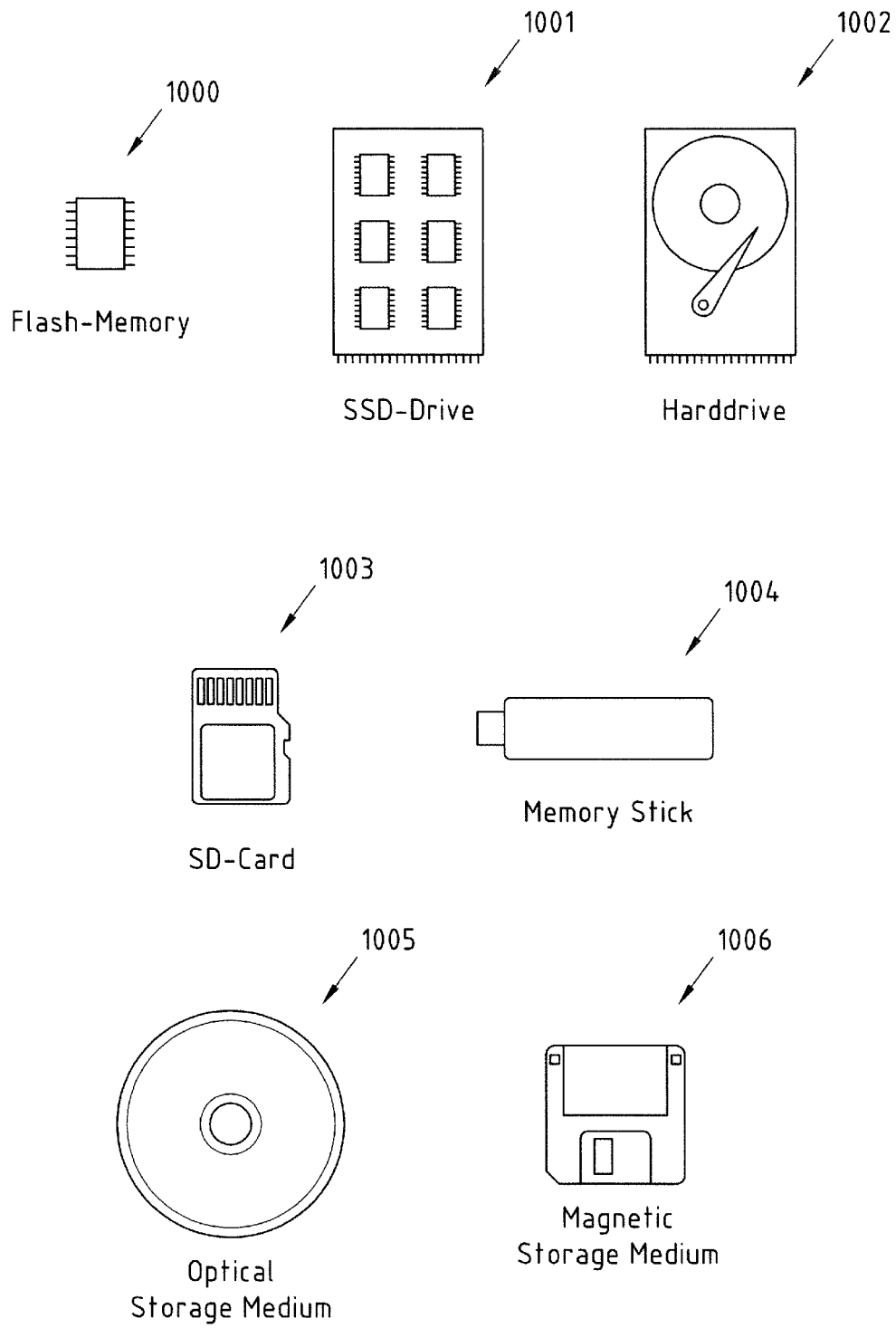
FIG. 6 is a schematic illustration of examples of tangible and non-transitory storage media according to the present invention.

FIG. 6 is a schematic illustration of examples of tangible and non-transitory computer-readable storage media according to the present invention that may for instance be used to implement program memory 102 of FIG. 1a. To this end, FIG. 6 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 101 and 201 of FIGS. 1a and 1b, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method performed by an apparatus, the method comprising:
   at least one of receiving or holding available a model of a predetermined environment, wherein the model of the predetermined environment comprises a two- or three-dimensional graphical model of the predetermined environment;
   sensing at least one installation position of at least one installed radio positioning support device; and
   determining at least one potential installation position or area for installing at least one radio positioning support device in the predetermined environment, wherein said at least one potential installation position or area is determined at least partially based on said at least one installation position that has been sensed, the model of the predetermined environment and a radio coverage model for said at least one installed radio positioning support device, wherein the radio coverage model comprises a two- or three-dimensional coverage map, and wherein the radio coverage model comprises a parametric radio model representative of radio parameter values.

2. The method according to claim 1, said method further comprising:
   sensing at least one radio transmission parameter of said at least one installed radio positioning support device; and determining said radio coverage model for said at least one installed radio positioning support device at least partially based on said sensed radio transmission parameter.

3. The method according to claim 1, wherein said at least one installation position is one of a plurality of installation positions of a plurality of installed radio positioning support devices, wherein said at least one potential installation position or area is determined at least partially based on said plurality of installation positions and a plurality of radio coverage models for said plurality of installed radio positioning support devices.

4. The method according to claim 3, said method further comprising:
determining whether at least one installed radio positioning support device of said plurality of installed radio positioning support devices is observable at at least one specific position or within at least one specific area of said predetermined environment at least partially based on said plurality of installation positions and said plurality of radio coverage models.

5. The method according to claim 3, wherein a specific position or a specific area of said predetermined environment is only determined to be a potential installation position or area if it is determined that less than a predetermined number of installed radio positioning support devices of said plurality of installed radio positioning support devices are observable at said specific position or within said specific area.

6. A non-transitory computer readable storage medium in which computer program code is stored, the computer program code when executed by a processor causing at least one apparatus to perform:
at least one of receiving or holding available a model of a predetermined environment, wherein the model of the predetermined environment comprises a two- or three-dimensional graphical model of the predetermined environment;
sensing at least one installation position of at least one installed radio positioning support device; and
determining at least one potential installation position or area for installing at least one radio positioning support device in the predetermined environment, wherein the at least one potential installation position or area is determined at least partially based on the at least one installation position that has been sensed, the model of the predetermined environment and a radio coverage model for said at least one installed radio positioning support device, wherein the radio coverage model comprises a two- or three-dimensional coverage map, and wherein the radio coverage model comprises a parametric radio model representative of radio parameter values.

7. An apparatus, the apparatus comprising at least one processor and at least one memory including computer program code, the at least one memory and the computer program code configured to, with the at least one processor, cause the apparatus at least to:
at least one of receive or hold available a model of a predetermined environment, wherein the model of the predetermined environment comprises a two- or three-dimensional graphical model of the predetermined environment; and
sense at least one installation position of at least one installed radio positioning support device; and
determine at least one potential installation position or area for installing at least one radio positioning support device in the predetermined environment, wherein said at least one potential installation position or area is determined at least partially based on said at least one installation position that has been sensed, the model of the predetermined environment and a radio coverage model for said at least one installed radio positioning support device, wherein the radio coverage model comprises a two- or three-dimensional coverage map, and wherein the radio coverage model comprises a parametric radio model representative of radio parameter values.

8. The apparatus according to claim 7, wherein said installed radio positioning support device is one of:
a Bluetooth beacon;
a Bluetooth beacon enabling Bluetooth low energy mode;
a Bluetooth low energy beacon,
a cellular base station; or
an access point of a wireless local area network.

9. The apparatus according to claim 7, wherein said at least one memory and said computer program code are further configured to, with said at least one processor, cause said apparatus to:
receive at least one of said radio coverage model or information representing said at least at least one parameter of said radio coverage model.

10. The apparatus according to claim 7, wherein said at least one memory and said computer program code are further configured to, with said at least one processor, cause said apparatus to:
sense at least one radio transmission parameter of said at least one installed radio positioning support device or receive radio transmission parameter information representing said at least one radio transmission parameter of said at least one installed radio positioning support device; and
determine said radio coverage model for said at least one installed radio positioning support device at least partially based on said radio transmission parameter.

11. The apparatus according to claim 7, wherein said radio coverage model is a radio coverage model for said at least one installed radio positioning support device.

12. The apparatus according to claim 7, wherein said one or more potential installation positions or areas are determined to be on or within a boundary defined by said radio coverage model.

13. The apparatus according to claim 7, wherein said radio coverage model is one of or comprises one of:
a polygon;
a rectangle or a square;
a cuboid or a cube;
an ellipse or a circle; or
an ellipsoid or a sphere.

14. The apparatus according to claim 7, wherein said at least one installation position is one of a plurality of installation positions of a plurality of installed radio positioning support devices, wherein said one or more potential installation positions or areas are determined at least partially based on said plurality of installation positions and a plurality of radio coverage models for said plurality of installed radio positioning support devices.

15. The apparatus according to claim 14, wherein said at least one memory and said computer program code are further configured to, with said at least one processor, cause said apparatus to:
determine whether one or more installed radio positioning support devices of said plurality of installed radio positioning support devices are observable at one or more specific positions or within one or more specific areas of said predetermined environment at least partially based on said plurality of installation positions and said plurality of radio coverage models.

16. The apparatus according to claim 14, wherein a specific position or a specific area of said predetermined environment is only determined to be a potential installation position or area if it is determined that less than a predetermined number of installed radio positioning support devices of said plurality of installed radio positioning support devices are observable at said specific position or within said specific area.

17. The apparatus according to claim 7, wherein said at least one memory and said computer program code are further configured to, with said at least one processor, cause said apparatus to:
 provide installation information representing said one or more potential installation positions or areas.

18. The apparatus according to claim 7, wherein said at least one memory and said computer program code are further configured to, with said at least one processor, cause said apparatus to:
 provide installation information representing a number of said one or more potential installation positions or areas.

19. The apparatus according to claim 17, wherein said providing said installation information comprises displaying said installation information.

* * * * *